(12) United States Patent
Hobbs et al.

(10) Patent No.: US 8,909,133 B2
(45) Date of Patent: *Dec. 9, 2014

(54) GAIN MEASUREMENT AND MONITORING FOR WIRELESS COMMUNICATION SYSTEMS

(71) Applicant: Andrew LLC, Hickory, NC (US)

(72) Inventors: Neil T. Hobbs, Forest, VA (US); Nelson C. Schmidt, Jr., Lexington, VA (US); Thomas Kummetz, Kissing (DE); Fred William Phillips, Forest, VA (US)

(73) Assignee: Andrew LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/159,085

(22) Filed: Jan. 20, 2014

(65) Prior Publication Data

US 2014/0134943 A1    May 15, 2014

Related U.S. Application Data

(63) Continuation of application No. 12/706,001, filed on Feb. 16, 2010, now Pat. No. 8,634,766.

(51) Int. Cl.
| | |
|---|---|
| *H04B 3/36* | (2006.01) |
| *H04B 17/02* | (2006.01) |
| *H04B 17/00* | (2006.01) |
| *H04B 7/155* | (2006.01) |

(52) U.S. Cl.
CPC ............ *H04B 17/02* (2013.01); *H04B 17/0062* (2013.01); *H04B 7/15535* (2013.01); *H04B 17/0055* (2013.01); *H04B 17/0065* (2013.01)
USPC .......... 455/8; 455/67.11; 455/11.1; 455/13.1; 370/241; 370/243

(58) Field of Classification Search
USPC ............ 455/67.11, 68–70, 115.3, 126, 127.1, 455/127.2, 135, 226.3, 277.2, 296, 114.2, 455/13.4, 501, 7–9, 11.1, 12.1, 13.1, 13.2, 455/14–17; 370/318, 226, 293, 241–246, 370/274, 279, 315, 492, 501
See application file for complete search history.

(56) References Cited

U.S. PATENT DOCUMENTS

| | | | |
|---|---|---|---|
| 3,963,992 | A | 6/1976 | Hekimian et al. |
| 4,028,622 | A | 6/1977 | Evans et al. |

(Continued)

FOREIGN PATENT DOCUMENTS

| | | |
|---|---|---|
| CN | 1163029 | 10/1997 |
| EP | 0793292 A1 | 9/1997 |

(Continued)

OTHER PUBLICATIONS

Four-page annex to International Search Report mailed May 18, 2011 for corresponding PCT Application No. PCT/US2011/024000.

*Primary Examiner* — Dominic E Rego
(74) *Attorney, Agent, or Firm* — Wood, Herron & Evans, LLP

(57) ABSTRACT

A system and method of monitoring a signal repeating device in a wireless communication system is provided. An operational noise measurement is obtained by measuring a noise value outside of a bandwidth of a first element, but within a bandwidth of a second, subsequent element in a signal path of the device. The operational noise measurement is alternatively obtained by tuning an input band of the device to shift the input band partially or completely outside of a bandwidth of a first element to create an open band or by suppressing an input of an antenna and measuring noise within the open bandwidth of the device. A stored parameter is retrieved and compared to the measured operational noise. Alternatively, a leakage signal of the device may be received at a signal receiver and compared to a reference. The reference is a function of elements of the device in a leakage path of the leakage signal.

20 Claims, 14 Drawing Sheets

(56) References Cited

U.S. PATENT DOCUMENTS

| | | |
|---|---|---|
| 4,057,761 A | 11/1977 | Harbert et al. |
| 4,079,357 A | 3/1978 | Drebinger et al. |
| 4,109,206 A | 8/1978 | Numata |
| 4,143,323 A | 3/1979 | Cieslak et al. |
| 4,234,964 A | 11/1980 | Cieslak et al. |
| 4,245,352 A | 1/1981 | Karpowycz et al. |
| 4,317,223 A | 2/1982 | Farmer, Jr. |
| 4,385,400 A | 5/1983 | Malchow |
| 4,454,607 A | 6/1984 | Ogita |
| 4,524,446 A | 6/1985 | Sun et al. |
| 4,731,586 A | 3/1988 | Perkins |
| 4,761,687 A | 8/1988 | Rumreich |
| 4,850,038 A | 7/1989 | Shibata et al. |
| 4,864,639 A | 9/1989 | Dapore et al. |
| 4,933,987 A | 6/1990 | Parks |
| 4,972,353 A | 11/1990 | Kennedy et al. |
| 5,010,584 A | 4/1991 | Seki |
| 5,144,642 A | 9/1992 | Weinberg et al. |
| 5,170,392 A | 12/1992 | Riordan |
| 5,184,349 A | 2/1993 | Riordan |
| 5,239,666 A | 8/1993 | Truby |
| 5,257,407 A | 10/1993 | Heinzelmann |
| 5,285,473 A | 2/1994 | Conti et al. |
| 5,313,657 A | 5/1994 | Sakamoto et al. |
| 5,335,356 A | 8/1994 | Andersson |
| 5,377,231 A | 12/1994 | Sonntag |
| 5,404,161 A | 4/1995 | Douglass et al. |
| 5,465,406 A | 11/1995 | Whitecar et al. |
| 5,465,414 A | 11/1995 | Moskaluk et al. |
| 5,483,690 A | 1/1996 | Schroder |
| 5,491,722 A | 2/1996 | Jones et al. |
| 5,579,319 A | 11/1996 | Daniel |
| 5,613,232 A | 3/1997 | Toshida et al. |
| 5,621,767 A | 4/1997 | Brandt et al. |
| 5,689,814 A | 11/1997 | Hagisawa et al. |
| 5,689,816 A | 11/1997 | Lee et al. |
| 5,722,059 A | 2/1998 | Campana, Jr. |
| 5,722,060 A | 2/1998 | Horigome |
| 5,722,063 A | 2/1998 | Peterzell et al. |
| 5,745,844 A | 4/1998 | Kromer et al. |
| 5,809,400 A | 9/1998 | Abramsky et al. |
| 5,809,407 A | 9/1998 | Kasperkovitz et al. |
| 5,809,408 A | 9/1998 | Fujimoto et al. |
| 5,832,038 A | 11/1998 | Carsello |
| 5,832,369 A | 11/1998 | Bradley et al. |
| 5,832,372 A | 11/1998 | Clelland et al. |
| 5,835,848 A | 11/1998 | Bi et al. |
| 5,839,060 A | 11/1998 | Kasperkovitz et al. |
| 5,878,334 A | 3/1999 | Talisa et al. |
| 5,907,798 A | 5/1999 | Abramsky et al. |
| 5,909,645 A | 6/1999 | Abramsky et al. |
| 5,913,158 A | 6/1999 | Sullivan |
| 5,923,454 A | 7/1999 | Eastmond et al. |
| 5,930,692 A | 7/1999 | Peterzell et al. |
| 5,937,005 A | 8/1999 | Obuchi et al. |
| 5,963,850 A | 10/1999 | Foster |
| 6,006,077 A | 12/1999 | Shull |
| 6,011,962 A | 1/2000 | Lindenmeier et al. |
| 6,021,269 A | 2/2000 | Lewis |
| 6,049,361 A | 4/2000 | Kim |
| 6,061,393 A | 5/2000 | Tsui et al. |
| 6,064,655 A | 5/2000 | Murphy |
| 6,125,138 A | 9/2000 | Kumagai |
| 6,131,014 A | 10/2000 | Nishimura |
| 6,148,188 A | 11/2000 | Sullivan |
| 6,233,274 B1 | 5/2001 | Tsui et al. |
| 6,256,494 B1 | 7/2001 | Lopes et al. |
| 6,259,391 B1 | 7/2001 | Pakravan et al. |
| 6,310,646 B1 | 10/2001 | Shi et al. |
| 6,363,127 B1 | 3/2002 | Heinonen et al. |
| 6,456,824 B1 | 9/2002 | Butte et al. |
| 6,466,137 B1 | 10/2002 | Lin et al. |
| 6,483,355 B1 | 11/2002 | Lee et al. |
| 6,498,927 B2 | 12/2002 | Kang et al. |
| 6,522,870 B1 | 2/2003 | Tinaphong et al. |
| 6,546,234 B2 | 4/2003 | Choe et al. |
| 6,564,043 B2 | 5/2003 | Rauhala |
| 6,574,292 B2 | 6/2003 | Heinonen et al. |
| 6,574,472 B1 | 6/2003 | Scheinert |
| 6,577,851 B1 | 6/2003 | Ecklund et al. |
| 6,621,349 B2 | 9/2003 | Mullgrav, Jr. |
| 6,687,491 B2 | 2/2004 | Wieck |
| 6,690,921 B1 | 2/2004 | Nagayama et al. |
| 6,744,882 B1 | 6/2004 | Gupta et al. |
| 6,781,424 B2 | 8/2004 | Lee et al. |
| 6,807,406 B1 | 10/2004 | Razavi et al. |
| 6,822,696 B2 | 11/2004 | Talmola et al. |
| 6,823,028 B1 | 11/2004 | Phanse |
| 6,826,390 B1 | 11/2004 | Tamura |
| 6,829,488 B1 | 12/2004 | Sato et al. |
| 6,850,735 B2 | 2/2005 | Sugar et al. |
| 6,862,439 B2 | 3/2005 | Feng |
| 6,871,066 B1 | 3/2005 | Khullar et al. |
| 6,873,212 B2 | 3/2005 | Rogers |
| 6,889,033 B2 | 5/2005 | Bongfeldt |
| 6,904,274 B2 | 6/2005 | Simmons et al. |
| 6,912,380 B2 | 6/2005 | Yamawaki et al. |
| 6,922,553 B2 | 7/2005 | Blatz et al. |
| 6,952,459 B2 | 10/2005 | Voyer |
| 6,957,047 B1 | 10/2005 | Young et al. |
| 6,975,848 B2 | 12/2005 | Rawlins et al. |
| 6,978,117 B2 | 12/2005 | Zerod et al. |
| 6,982,745 B2 | 1/2006 | Miyabayashi |
| 6,983,135 B1 | 1/2006 | Tsai et al. |
| 6,993,309 B2 | 1/2006 | Tsujishita et al. |
| 6,993,315 B1 | 1/2006 | Frazier |
| 7,006,041 B2 | 2/2006 | Fujii et al. |
| 7,006,797 B1 | 2/2006 | Sullivan et al. |
| 7,010,330 B1 | 3/2006 | Tsividis |
| 7,023,374 B2 | 4/2006 | Jossef et al. |
| 7,027,784 B2 | 4/2006 | Haapoja |
| 7,035,593 B2 | 4/2006 | Miller et al. |
| 7,039,376 B2 | 5/2006 | Isoda |
| 7,046,964 B1 | 5/2006 | Sullivan et al. |
| 7,050,825 B2 | 5/2006 | Ginesi et al. |
| 7,054,602 B2 | 5/2006 | van der Pol |
| 7,054,605 B1 | 5/2006 | Groe |
| 7,065,165 B2 | 6/2006 | Heinonen et al. |
| 7,068,171 B2 | 6/2006 | Gardenfors et al. |
| 7,076,009 B2 | 7/2006 | Wieck |
| 7,076,225 B2 | 7/2006 | Li et al. |
| 7,079,825 B2 | 7/2006 | Wieck |
| 7,084,808 B2 | 8/2006 | Ratzel et al. |
| 7,102,569 B2 | 9/2006 | Tan et al. |
| 7,107,008 B2 | 9/2006 | Wuidart |
| 7,116,943 B2 | 10/2006 | Sugar et al. |
| 7,116,958 B1 | 10/2006 | Brown et al. |
| 7,155,167 B1 | 12/2006 | Carty |
| 7,155,230 B2 | 12/2006 | Tsien |
| 7,171,161 B2 | 1/2007 | Miller |
| 7,171,211 B2 | 1/2007 | Muller |
| 7,174,190 B2 | 2/2007 | Walker et al. |
| 7,177,610 B2 | 2/2007 | Scott et al. |
| 7,190,937 B1 | 3/2007 | Sullivan et al. |
| 7,203,472 B2 | 4/2007 | Seppinen et al. |
| 7,212,798 B1 | 5/2007 | Adams et al. |
| 7,215,937 B2 | 5/2007 | Someya |
| 7,218,904 B2 | 5/2007 | Staszewski et al. |
| 7,239,659 B2 | 7/2007 | Thomas et al. |
| 7,245,893 B1 | 7/2007 | Husted et al. |
| 7,248,653 B2 | 7/2007 | Wieck |
| 7,257,383 B2 | 8/2007 | Young et al. |
| 7,262,724 B2 | 8/2007 | Hughes et al. |
| 7,263,330 B2 | 8/2007 | Wuidart |
| 7,263,363 B2 | 8/2007 | Ruelke et al. |
| 7,269,144 B2 | 9/2007 | Gardenfors et al. |
| 7,269,395 B2 | 9/2007 | Choi et al. |
| 7,280,611 B2 | 10/2007 | Orihashi et al. |
| 7,286,826 B2 | 10/2007 | Kim et al. |
| 7,292,830 B1 | 11/2007 | Cheung et al. |
| 7,302,231 B2 | 11/2007 | Sun |
| 7,304,969 B2 | 12/2007 | Ryan et al. |
| 7,317,307 B2 | 1/2008 | Fischer |
| 7,319,847 B2 | 1/2008 | Xanthos et al. |

(56) References Cited

U.S. PATENT DOCUMENTS

| | | |
|---|---|---|
| 7,321,249 B2 | 1/2008 | Watanabe et al. |
| 7,324,783 B2 | 1/2008 | Anderson |
| 7,336,937 B2 | 2/2008 | Tervaluoto et al. |
| 7,353,010 B1 | 4/2008 | Zhang et al. |
| 7,353,020 B2 | 4/2008 | Saitou et al. |
| 7,356,321 B2 | 4/2008 | Cowley et al. |
| 7,356,322 B2 | 4/2008 | Hammerschmidt et al. |
| 7,359,692 B2 | 4/2008 | Saed et al. |
| 7,359,728 B2 | 4/2008 | Krishnan |
| 7,366,490 B2 | 4/2008 | Rouphael et al. |
| 7,369,833 B2 | 5/2008 | Smith |
| 7,373,105 B2 | 5/2008 | Dybdal et al. |
| 7,373,125 B2 | 5/2008 | Godambe et al. |
| 7,386,063 B1 | 6/2008 | Husted |
| 7,386,075 B2 | 6/2008 | Mostov et al. |
| 7,389,092 B2 | 6/2008 | Smith |
| 7,389,097 B2 | 6/2008 | Tamura |
| 7,392,027 B2 | 6/2008 | Ishihara |
| 7,395,548 B2 | 7/2008 | Runzo |
| 7,414,580 B2 | 8/2008 | Adler et al. |
| 7,415,256 B2 | 8/2008 | Nakano |
| 7,415,259 B2 | 8/2008 | Fishman et al. |
| 7,418,240 B2 | 8/2008 | Hsu et al. |
| 7,424,270 B2 | 9/2008 | Gaal |
| 7,428,424 B2 | 9/2008 | Hwang et al. |
| 7,433,431 B2 | 10/2008 | Birkett |
| 7,447,490 B2 | 11/2008 | Kuo et al. |
| 7,457,603 B2 | 11/2008 | Smith |
| 7,460,583 B2 | 12/2008 | Khayrallah et al. |
| 7,463,704 B1 | 12/2008 | Tehrani et al. |
| 7,474,893 B2 | 1/2009 | Rush |
| 7,480,483 B2 | 1/2009 | Takano |
| 7,480,498 B2 | 1/2009 | Jin |
| 7,486,942 B2 | 2/2009 | Sakurai |
| 7,496,163 B2 | 2/2009 | Terao |
| 7,515,093 B2 | 4/2009 | Humphrey |
| 7,515,879 B2 | 4/2009 | Okabe et al. |
| 7,539,273 B2 | 5/2009 | Struckman |
| 7,542,408 B2 | 6/2009 | Mochizuki |
| 7,548,735 B1 | 6/2009 | Sullivan et al. |
| 7,548,738 B2 | 6/2009 | Srinivasan et al. |
| 7,555,270 B2 | 6/2009 | Chao et al. |
| 7,570,934 B2 | 8/2009 | Shalash |
| 7,590,399 B2 | 9/2009 | Shatara et al. |
| 7,603,093 B2 | 10/2009 | Kremer et al. |
| 7,643,810 B2 | 1/2010 | Husted et al. |
| 7,646,325 B2 | 1/2010 | Schuur et al. |
| 7,668,514 B2 | 2/2010 | Ojo et al. |
| 7,671,681 B2 | 3/2010 | Behzad et al. |
| 7,675,293 B2 | 3/2010 | Christophersen et al. |
| 7,711,347 B2 | 5/2010 | Kwon et al. |
| 7,777,496 B2 | 8/2010 | Evans et al. |
| 7,778,617 B2 | 8/2010 | Gomez et al. |
| 7,853,227 B2 | 12/2010 | Stevenson et al. |
| 7,853,229 B2 | 12/2010 | Maulik et al. |
| 7,872,738 B2 | 1/2011 | Abbott |
| 7,912,437 B2 | 3/2011 | Rahman et al. |
| 7,929,937 B2 | 4/2011 | Koivunen et al. |
| 7,944,385 B2 | 5/2011 | Le Guillou |
| 7,944,775 B2 | 5/2011 | Sugiyama |
| 8,019,360 B2 | 9/2011 | Qahwash |
| 8,023,599 B2 | 9/2011 | Tanaka et al. |
| 8,027,416 B2 | 9/2011 | Mason et al. |
| 8,027,642 B2 | 9/2011 | Proctor, Jr. et al. |
| 8,036,164 B1 | 10/2011 | Winters et al. |
| 8,112,040 B2 | 2/2012 | Lee et al. |
| 8,116,711 B2 | 2/2012 | Pervez et al. |
| 8,160,510 B2 | 4/2012 | Kanou |
| 8,264,348 B2 | 9/2012 | Dinh |
| 8,285,339 B2 | 10/2012 | Shin |
| 8,290,449 B2 | 10/2012 | Keehr et al. |
| 8,306,494 B2 | 11/2012 | Ojo |
| 8,483,293 B2 | 7/2013 | Wilhelmsson et al. |
| 8,532,428 B2 | 9/2013 | Inoue |
| 8,626,079 B2 | 1/2014 | Lee et al. |
| 8,634,766 B2 | 1/2014 | Hobbs et al. |
| 2004/0160596 A1 | 8/2004 | He et al. |
| 2004/0235485 A1 | 11/2004 | Tanaka |
| 2005/0025110 A1 | 2/2005 | Becker et al. |
| 2005/0221779 A1 | 10/2005 | Okanobu |
| 2006/0223471 A1 | 10/2006 | Dupuie et al. |
| 2006/0293008 A1 | 12/2006 | Hiraki et al. |
| 2007/0004358 A1 | 1/2007 | Moorti |
| 2007/0066232 A1 | 3/2007 | Black |
| 2008/0070533 A1 | 3/2008 | Kim et al. |
| 2008/0112100 A1 | 5/2008 | Liu |
| 2009/0042527 A1 | 2/2009 | Niknejad |
| 2009/0058531 A1 | 3/2009 | Hwang et al. |
| 2009/0143065 A1 | 6/2009 | Mattila |
| 2009/0196373 A1 | 8/2009 | Snook |
| 2009/0298422 A1 | 12/2009 | Conroy et al. |
| 2010/0298016 A1 | 11/2010 | Madan et al. |
| 2011/0028169 A1 | 2/2011 | Baumann et al. |
| 2011/0130163 A1 | 6/2011 | Saban et al. |

FOREIGN PATENT DOCUMENTS

| | | |
|---|---|---|
| WO | 9519574 A1 | 7/1995 |
| WO | 2007117236 A1 | 10/2007 |
| WO | 2007149954 A1 | 12/2007 |

GAIN MEASUREMENT AND MONITORING FOR WIRELESS COMMUNICATION SYSTEMS

RELATED APPLICATIONS

This application is a Continuation application of and claims the benefit of U.S. application Ser. No. 12/706,001, filed Feb. 16, 2010, entitled "GAIN MEASUREMENT AND MONITORING FOR WIRELESS COMMUNICATION SYSTEMS", which application is incorporated by reference herein in its entirety.

BACKGROUND OF THE INVENTION

The present invention is directed to wireless transceiver systems for use in wireless communication systems, and specifically is directed to gain monitoring in the wireless transceiver systems.

Contemporary cellular phone systems and broadband wireless metropolitan networks are generally divided into a number of cells distributed in a pattern to preclude co-channel interferences and provide coverage of mobile and fixed subscriber units operating within the service area of the system. Each cell generally includes a base station that employs radio frequency (RF) transceiver equipment, antennas, and wire line communication equipment. In addition, some cells also include repeaters, distributed antenna systems (DAS), and/or remote radio heads in order to extend the coverage of the base station over longer distances, throughout buildings or tunnels, around obstacles, etc. These coverage extension elements, hereafter generically referred to as "repeaters", serve to filter, amplify, and re-radiate signals in both directions, from the base station to subscriber units (the "downlink" direction), and from subscriber units back to the base station (the "uplink" direction).

A repeater is normally configured to provide either a fixed amount of output power or a fixed amount of gain in each direction. Maintaining the desired operating levels is critical to achieving optimal network coverage and performance. Simply measuring the output power of the repeater at any given time is inadequate to guarantee proper operation, as the input signal levels may vary over time.

Therefore there is a need in the art for an inexpensive system able to monitor the total system gain and overall performance of a repeater, and to provide an indication if its performance falls outside pre-determined limits.

SUMMARY OF THE INVENTION

Embodiments consistent with the invention provide a method of monitoring at least one element of a wireless communication system. An operational noise measurement may be obtained by measuring a noise value outside of a bandwidth of a first device, but within a bandwidth of a second, subsequent device. A stored parameter may be retrieved and the measured operational noise measurement may be compared to the retrieved parameter.

In other embodiments an input band of the element of the wireless communication system may be tuned to shift the input band partially or completely outside of a bandwidth of a first device to create an open band. An operational noise level may be measured in the open band. A stored parameter is retrieved and may be compared to the measured operational noise level.

In still other embodiments, an operational noise level by may be obtained by suppressing an input of the antenna and measuring noise within a bandwidth of the element of the wireless communication network. A stored parameter is retrieved and compared to the measured operational noise level.

Some embodiments receive a leakage signal of the element of the wireless communications system at a signal receiver. The received leakage signal may then be compared to a reference. The reference may be a function of components of the wireless communication system in a leakage path of the leakage signal.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

Figure 1A:
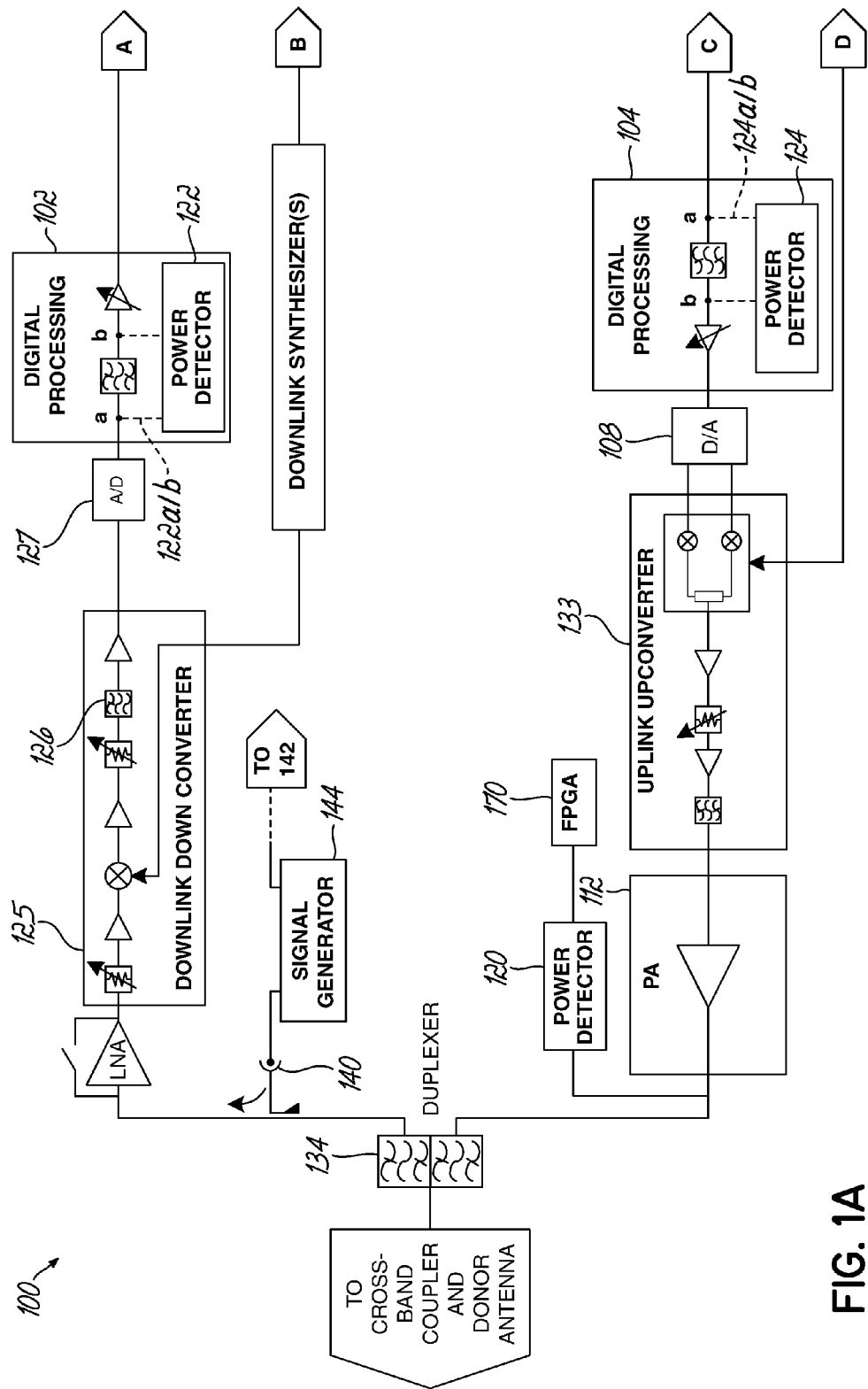
FIGS. 1A and 1B contain a block diagram of an exemplary repeater consistent with embodiments of the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration. Also, where appropriate, similar reference numbers have been used to indicate like parts.

DETAILED DESCRIPTION OF THE INVENTION

Embodiments of the present invention are directed to an apparatus and method of measuring or monitoring gain in a wireless communication system. Measurements of gain may be used for additional diagnostics, such as fault detection. For example, service providers are interested in knowing whether an amplifier in the communication system has blown or whether another component has failed, such that the communication system is not operating properly, in order to quickly service or replace the repeater or component. Some contemporary communication systems use power detectors to monitor or measure output power; however, such solutions cannot measure total system gain or identify fault conditions in a repeater because the input signal level is not known. A second detector could be placed at the repeater input, but this solution would be expensive due to the additional hardware and high dynamic range required. Instead, the various embodiments of the present invention offer lower cost solutions for total system gain measurement and fault detection. The methodology of the embodiments of the invention disclosed herein is illustrated in the form of a repeater; however, the methodology is generic enough to measure gain in many related types of wireless communication system elements, such as Distributed Antenna Systems (DAS) and remote radio heads (RRH), as well as RF amplifiers where gain may be similarly measured.

While various approaches to measuring the repeater or other wireless communication system element gains are available, each approach has its relative advantages and disadvantages. One approach employed by embodiments of the invention measures and/or monitors front end (low noise amplifier and down-converter) and back end (up-converter and power amplifier) gains together. Some embodiments measure/monitor the front and back end gains separately. Regardless of the approach, the gains may be compared to predetermined threshold values for a determination of the state of the device. Additionally, the approach may measure/monitor all of the front end and/or back end gains, or may only measure portions of those sections.

Overview

Embodiments of the invention employ methods to measure gain in a system element in a wireless communication system. These elements may include repeater systems, distributed antenna systems (DAS), remote radio heads (RRH), and/or RF amplifiers as well as any combination of the elements. The determination of the gain in the embodiments is performed by the measurement of the gain in various sections of the system element, which are typically front-ends and back-ends. The system gain is then determined by multiplication (or addition if the gain measurements are in decibel) of the elements of a cascade. Methods for determining front-end and back-end gain are briefly presented with detailed descriptions of the methods to follow.

In one embodiment for determining front end gain, a noise level in an unoccupied part of the receiver spectrum is measured. The front-end section gain may be determined through the ratio of the measured noise level to an equivalent input noise level. The equivalent input noise level may be determined by the front-end section noise as a stored reference value for the various settings of the front-end section and a thermal noise level at the current temperature, where the temperature may be determined by an on-board sensor. In an alternate embodiment for determining front end gain, the down-converter local oscillator may be shifted into a first receive band filter rejection band such that there is an unoccupied part of the spectrum when a noise measurement may be measured. Once measured, the gain for this embodiment may be determined similar to that of the embodiment above. Alternately, the receive antenna may be disconnected by using a RF switch or otherwise suppressed to create an unoccupied part of the spectrum for a noise measurement. Gain may then be determined as set forth above.

In one embodiment for determining a back-end gain, a signal level may be measured at the input of the back-end. The signal at the output of the back-end may also be measured and the gain may then be determined from the ratio of the two measurements or the difference if the signals are represented as decibels. In an alternate embodiment, the signal level may be measured at the input to the back-end as well as a measurement of the spill-over of the back-end output that is received via a pre-determined leakage of the duplexer filter or an over-the-air leakage of known value into the front-end of the opposite direction link. The back-end gain may then be determined by determining the ratio between front-end output of the signal level and back-end input under consideration of the front-end gain as determined in an open band of the front end as set forth above and the pre-determined leakage between front-end and back-end. In another embodiment for determining back end gain, the signal level may be measured at the input to the back-end as well as a measurement of the leakage of the back-end output that is received via an external, controllable, and determined leakage path of known value into the front-end of the same direction link. The back-end gain may then be determined by determining the ratio between front-end output of the signal level and back-end input under consideration of the front-end gain as determined in using an open band of the front end as set forth above and the determined leakage between front-end and back-end.

The system element gain may be determined by the application of any combination of the front end gain embodiments and the back end gain embodiments, which may be appropriate and suitable for the specific system. Additionally, the system gain, front-end section gain, or back-end section gain may be compared to a stored reference value. Any deviation from this comparison exceeding a predetermined threshold may trigger an alarm.

In general, back-end gain determination is more straight forward than front-end gain determination. Therefore, the discussion below will begin with several methods for determining Back-End gain and then several methods for determining Front-End gain.

Back-End Gain

As used in this document, the "back-end" portion of the communication system may be defined as all of the components from a reference point to an output antenna. This may include all, part, or none of a digital signal processing section close to an input of the back-end. The back-end section of the system may include, in any order, one or more amplifiers, one or more amplifiers plus one or more filters, one or more amplifiers and filters plus one or more frequency mixers, or one or more D/A converters with or without additional components. The back-end section of the system may also include various other components such as attenuators and the like. Referring to the block diagram of an exemplary repeater 100 in FIG. lA, the "back-end" may include all of the main signal path elements from the signal power measurement receiver connected to reference point 124a or 124b through the Duplexer 134. For the purpose of a back-end gain measurement a reference point 124b may be preferred as it would only measure the relevant signal spectrum that will be fed into the back-end line-up. For the purpose of front-end measurements, reference point 124a may be preferred, though either reference point may be used for either front-end or back-end measurements.

In some embodiments, power detector 120 may be a wide band element configured to measure RMS power, but may as well be band-limited or time window limited. In other embodiments, a spectrum analyzer or a signal measurement receiver with configurable RF and IF measurement bandwidths and configurable power detectors may be used as well. Still other embodiments may employ an equivalent digital signal implementation of a band-limited or a band-unlimited power detector. The power detector may be connected anywhere along the component line-up depending on the specific needs.

Figure 1B:
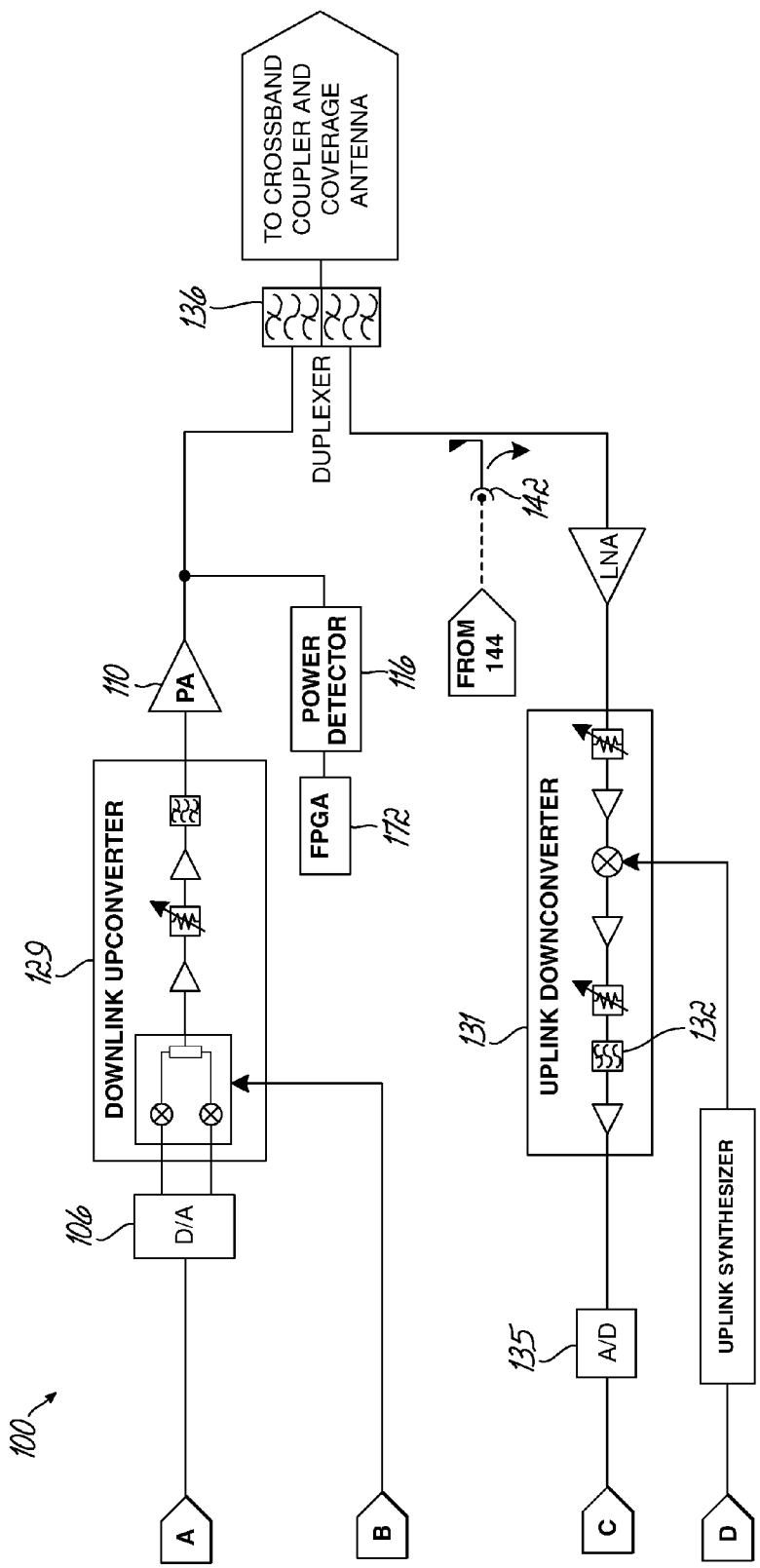

Referring again to the block diagram of an exemplary repeater 100 in FIGS. 1A and 1B, when considering back-end gain determination, the amount of total composite power that digital sections 102, 104 (before upconverters 129, 133) are sending to the digital-to-analog converters ("DAC") 106, 108 will already be known as it is easily computed from the digitized signal waveform captured at reference point 124a or 124b in the digital section 104. Composite power at the output of power amplifiers ("PA") 110, 112 is also readily measureable. With these known composite power values, back end gain may be calculated by subtraction for level values represented in decibels or signal level division if linear level representations are used. These calculations use the assumption that no extra signals of significant power level are generated between the reference point 122a or 122b and the output of power amplifier 110 or the reference point 124a or 124b and the output of power amplifier 112. Readings from power detectors 116, 120, 122, and 124 and the corresponding exact transmit gain may be calibrated at factory test time. Depending on the application, inexpensive power detectors, such as the LMV225/226/228 series from National Semiconductor or the MAX 2206/2207/2208 from Maxim, for example, may be used for back-end gain determination. These particular detectors offer a limited dynamic range of approximately 30-40 dB.

For the downlink direction, 30-40 dB of range would likely be sufficient. However, in the uplink direction, there may be times when the output level is too small to read with the power detectors 120, 124, which would potentially cause false failure alarms. These false alarms could be avoided by using a higher dynamic range detector. Alternatively, an inexpensive detector may still be used if the gain measurement is disregarded any time the DAC 106, 108 drive level is small. False alarms may then be avoided simply by ignoring those readings. In other words, the uplink transmitter gain would only be monitored or measured when a "large enough" signal is present, for example, greater than approximately −90 to −80 dBm at the repeater input, depending on repeater gain settings and maximum output power.

Front-End Gain

As used in this document, the "front-end" portion of the communication system can be defined as everything between the input antenna and a reference point of the system. This may include all, part, or none of a digital signal processing section close to the output of the front-end. The front-end section of the system may include, in any order, one or more amplifiers, one or more amplifiers plus one or more filters, or one or more amplifiers and filters plus one or more frequency mixers. The front-end section of the system may also include various other components such as A/D converters 127, attenuators, and the like. Referring to the block diagram of an exemplary repeater 100 in FIG. IA, the "front-end" would comprise all of the main signal path elements, such as amplifiers and a down converter 125 having mixers, amplifiers, and filters to perform down conversion plus A/D converter 127, from the duplexer 134 through the signal power measurement receiver, power detector 122, capturing the signal at reference point 122a or 122b (A similar front end for the uplink direction would include all of the main signal path elements, such as amplifiers and a down converter 131 having mixers, amplifiers, and filters for down conversion and A/D converter 135). For the purpose of the front-end gain measurement a reference point 122a before the filter may be preferred as it allows more flexibility with respect to the frequency of the signal measurement taken, though the reference point after the filter 122b may also be used.

Power detectors 122, 124 may be implemented in a variety of ways. The power detector may be a wide band element configured to measure RMS power, but for the purpose of the front-end gain, should be band-limited. The power detector may be time window limited as well. A spectrum analyzer or a signal measurement receiver with configurable RF and IF measurement bandwidths and configurable power detectors may also be used. The equivalent digital signal implementation of a band-limited or a band-unlimited power detector may be another alternative.

Detecting front-end gain presents a more challenging problem than measuring back-end gain due to the unknown signals being received in the uplink and downlink directions. However, the overall repeater system has an existing operational noise level that is known. The front-end detection may utilize this known noise level and measure a difference between a threshold noise level that may be previously determined and stored (for example, during factory calibration) and an existing operational noise level. The operational noise level is measured during operation of the repeater. The operational measurement may then be compared to the stored, calibrated noise floor. An operational measurement resulting in a difference or delta that exceeds a pre-determined threshold may indicate that a device or amplifier within the repeater has failed or is malfunctioning. While seemingly straight forward, the measurement of the operational noise in bands with signals can be challenging.

Figure 2:
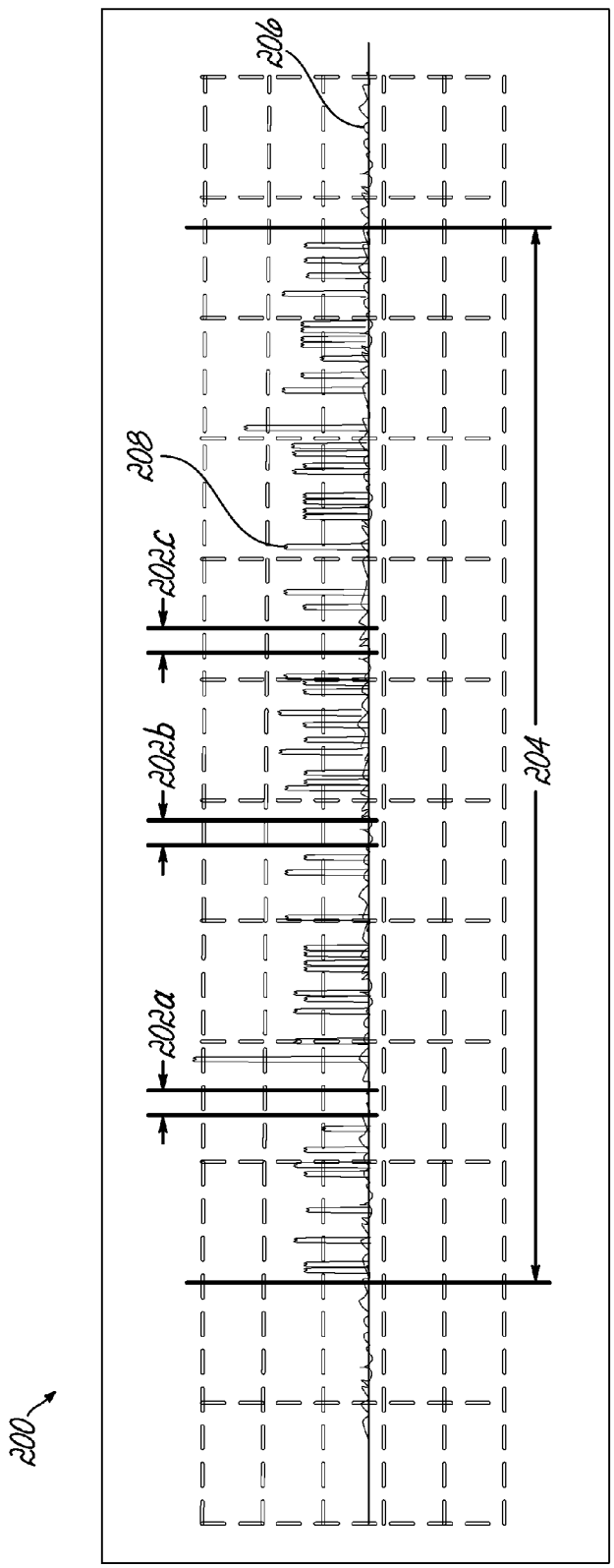
FIG. 2 is a graph illustrating unused segments of an input band.

A first embodiment of the front-end gain detection, as illustrated in the graph 200 in FIG. 2, utilizes a band-limited noise power measurement in an unused segment 202a, 202b, 202c of the band 204. The digital sections 102, 104 may include built-in measurement receivers/power detectors 122, 124 as shown in FIGS. 1A and 1B. The power detectors 122, 124 may be utilized to measure the noise floor 206 and compare it with a stored/calibrated level that was previously measured. Any deviation from the original calibrated down converter gain, such as that caused by amplifier failure, temperature, or aging, may generally show up as a difference in noise levels. For example, if a device fails, the operational noise floor will likely drop. The unused segments 202a, 202b, 202c may move within the band depending on where signals 208 are received, or the unused segments 202a, 202b, 202c may be reserved segments, or guard bands, used to isolate adjacent bands. While this embodiment is simple to implement, it requires that there be at least one unused band that can be utilized for the noise measurements.

Figure 3:
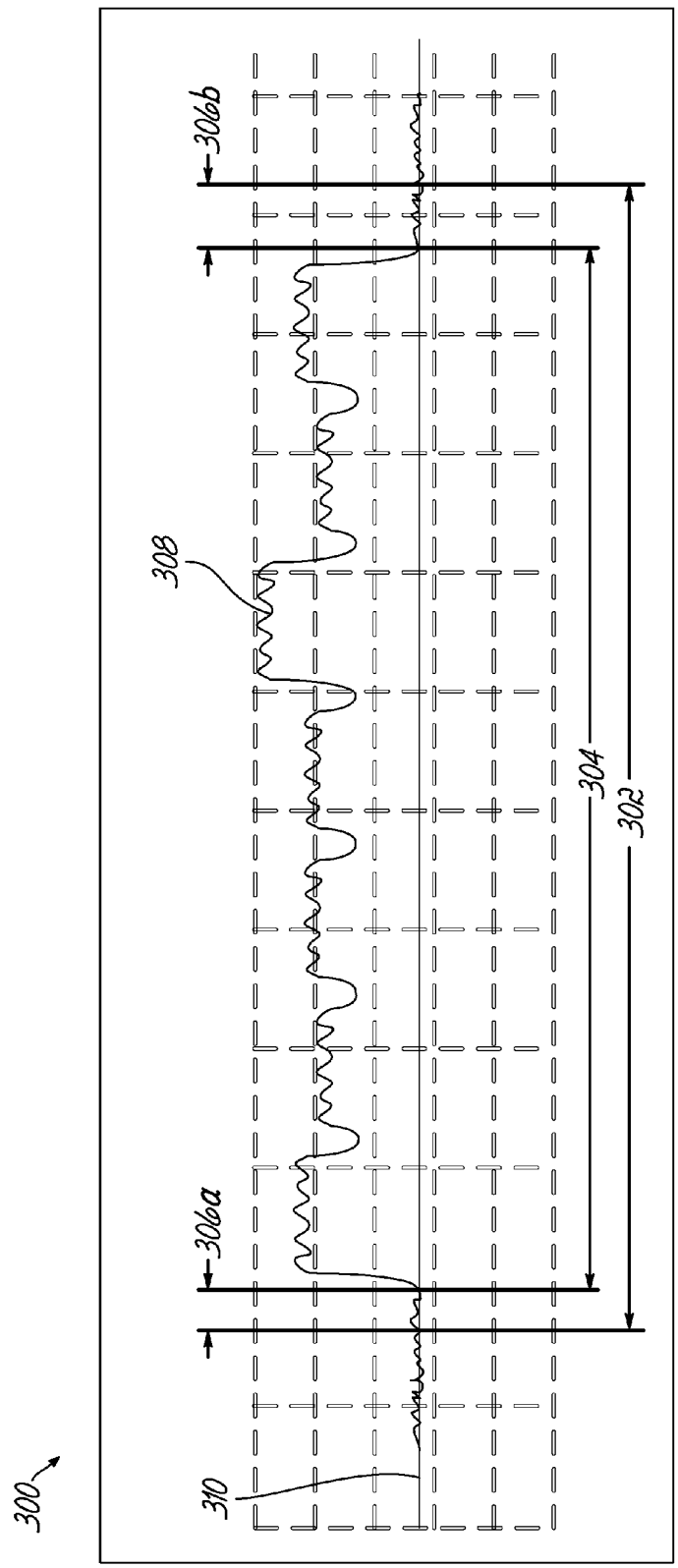
FIG. 3 is a graph illustrating available segments of a filter band around an input band.

When the band is fully occupied, the first embodiment above cannot be used. However, in some embodiments of the repeater 100 and as illustrated in the graph 300 in FIG. 3, the IF filters 126, 132 in FIGS. 1A and 1B, together with any other intervening RF or IF filters that may optionally be included, may have a wider bandwidth 302 than the bandwidth 304 of the duplexers 134, 136. In some embodiments, the IF filters may be implemented as SAW filters. Alternatively, the wider bandwidth filtering may be accomplished at baseband frequencies, implemented as analog and/or digital filters. Therefore, a usable portion 306a, 306b of the spectrum exists that sees the full down-converter gain but does not contain outside interference from signals 308 which would overwhelm the noise floor 310. Operational noise may be measured in the bands 306a, 306b outside of the duplexer band 304 and compared with the stored/calibrated level that was measured during factory test. As with the previous embodiment, any deviation from the original calibrated down converter gain, such as that caused by amplifier failure, temperature, or aging, may generally show up as a difference in noise levels.

For bands where the IF filters 126, 132 do not have extra bandwidth, the system may behave like the first front-end embodiment described above. Most applications may still have enough gaps between the received signals due to frequency re-use patterns, guard bands, etc. that the measurement receiver may find a reasonable noise floor. In the few cases which do not have gaps that allow precise measurement, failures may not be able to be detected, however, there will also not be false "receiver failure" alarms, because the signal level will be higher, not lower, than the calibrated noise level.

Figure 4:
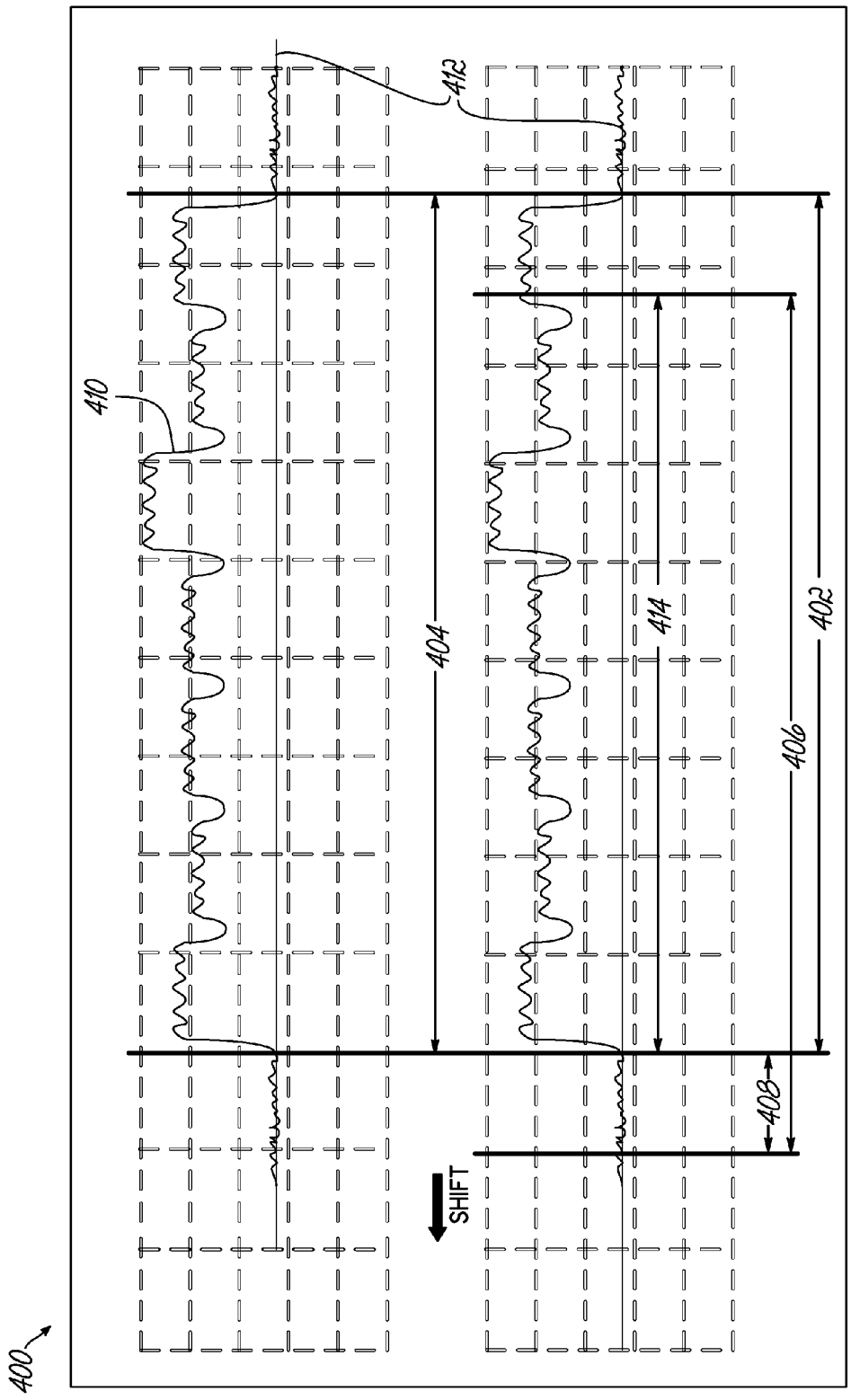
FIG. 4 is a graph illustrating frequency shifting an input band to create an unused segment.

Situations and configurations may exist where the IF filters 126, 132 do not have extra bandwidth beyond the bandwidth of the duplexers, for example, and as illustrated in the graph 400 in FIG. 4, the bandwidth 402 of the IF filters 126, 132 is the same or narrower than the bandwidth 404 of the duplexers 134, 136. In an alternate embodiment for this inventive configuration, the receiver may be intentionally mistuned to be briefly shifted as shown in the window 406 to look at a frequency range outside of the input duplexer filter bandwidth 404. After shifting, a usable portion 408 of the spectrum now exists that sees the full down-converter gain but does not contain outside interference from signals 410, which would overwhelm the noise floor 412. In this embodiment, local oscillators may be shifted by a few MHz and allow for a noise 412 measurement to be made in the small band 408 outside the duplexer bandwidth 404. As with the previous embodiment, any deviation from the original calibrated down converter gain, such as that caused by amplifier failure, temperature, or aging, may generally show up as a difference in noise levels. If thresholds are exceeded, failure alarms may be sent.

In some repeaters, the transmitters and receivers of the repeater may have separate local oscillators. This separation may allow for continued repeating of the vast majority of the band 414 during the shifting 406 operation. In other embodiments, if the full bandwidth is not being used, for example, the power detectors 122, 124 (FIGS. 1A and 1B) may look to the unused portion first even though rest of band may be full. If there are no unused portions, briefly frequency shifting the duplexer band 404 may be performed as set forth above. In other embodiments, the frequency shift may be permanently set during installation if there is no intention to repeat signals near one of the band edges.

Frequency shifting may also be implemented in an embodiment having a IF filter with a bandwidth greater than the duplex filter. If the bandwidths are close, the input signal band may be shifted toward one end of the IF filter band, creating a larger band for noise measurement. In this embodiment, the full signal (duplexer) bandwidth may be processed by adjusting the up-converter to shift the band back. Other combinations of the above embodiments may also be made to facilitate noise measurements for evaluating the front-end gains.

Figure 5A:
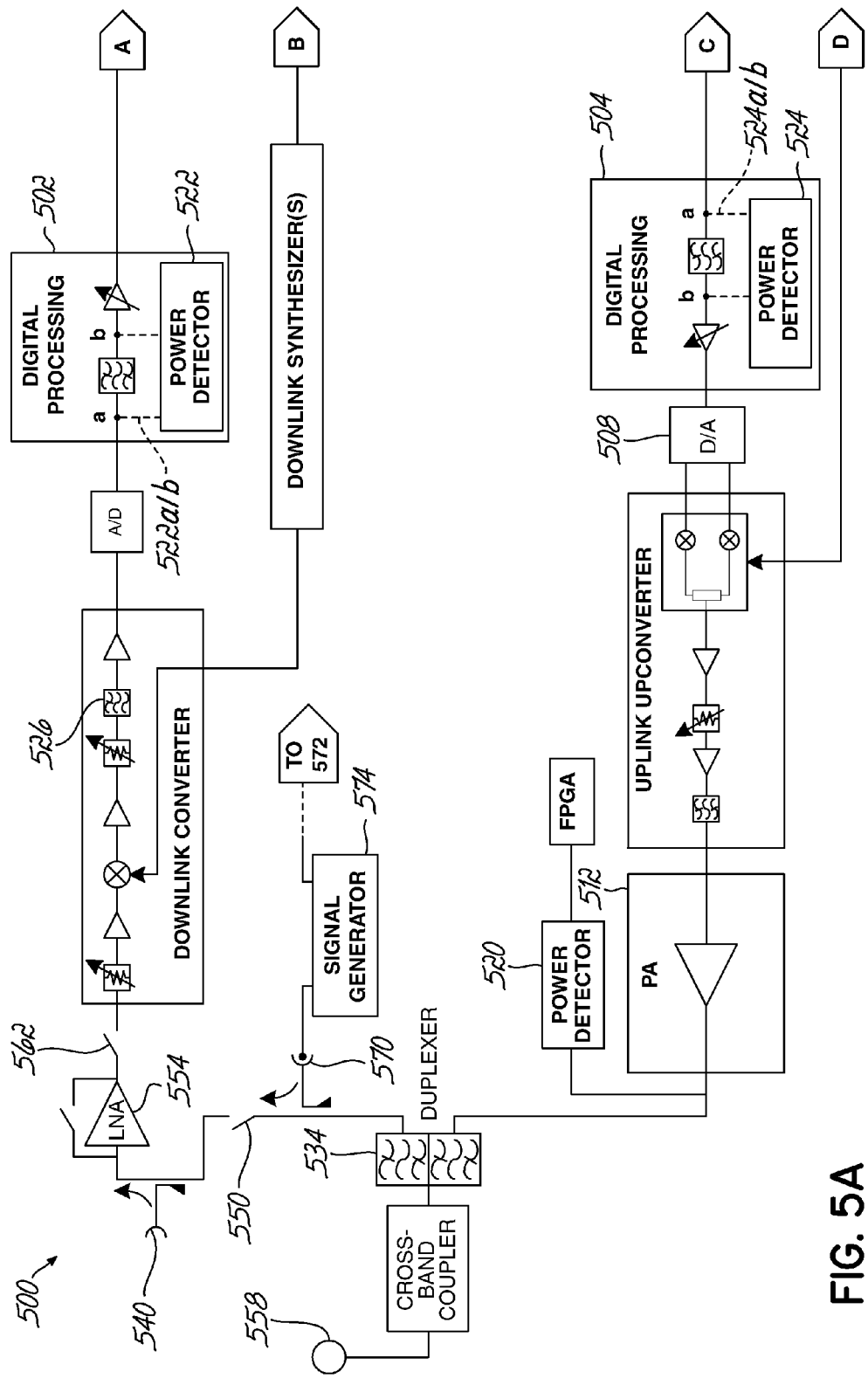
FIGS. 5A and 5B contain an alternate embodiment of the block diagram of the repeater in FIGS. 1A and 1B.
Figure 5B:
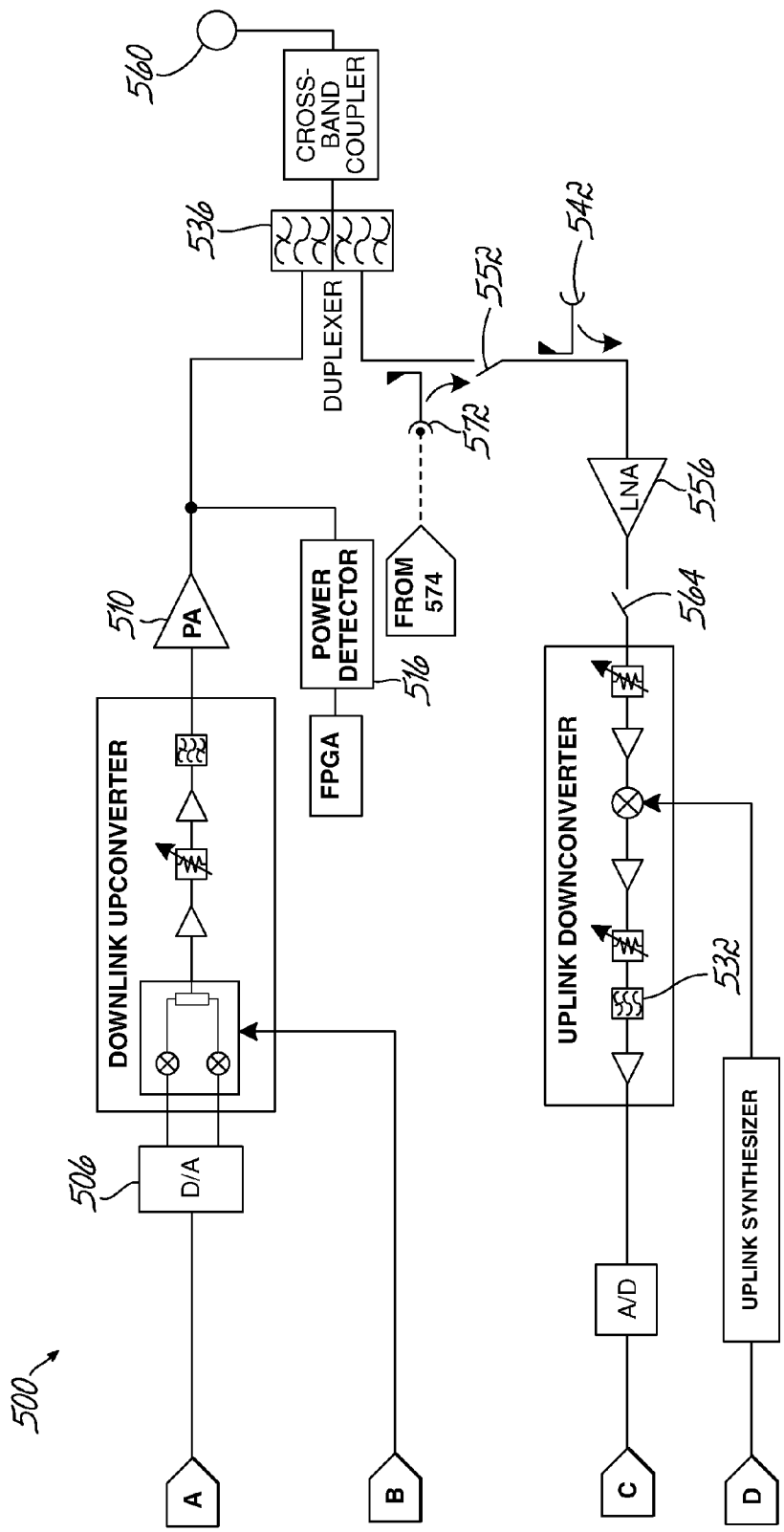

In an alternate embodiment of the repeater 500 in FIGS. 5A and 5B, high isolation switches 550, 552 may be implemented after the duplexer filters 534, 536, but before the low noise amplifiers 554, 556 at the front-end. The switches 550, 552 terminate the antennas 558, 560 such that the receiver would be switched to purely noise input for a brief period of time. During the brief period with no signal from the antennas, noise may be measured anywhere in the communication band. As with the previous embodiments, power detectors 522, 524 may be utilized to measure the operation noise and compare it with a stored/calibrated level that was previously measured. Again, any deviation from the original calibrated down-converter gain, such as that caused by amplifier failure, temperature, or aging, may generally show up as a difference in noise levels, indicating a potential problem with the repeater 500. Because this embodiment completely interrupts the repeating function of the repeater, the switching and noise testing would likely be performed during non-peak hours, with the interruptions being of short durations, allowing for the noise testing to be accomplished. The antennas 558, 560 would then be switched back and normal operation of the repeater would then resume. In other embodiments, the switches 550, 552 which terminate the antennas may be replaced by other components that suppress signals received by the antennas without having to terminate the antennas 558, 560. Still other embodiments may inject amplified signals which may be used for gain determination without having to terminate the antennas 558, 560.

Alternatively, a signal may be generated by a signal generator 574 that could be injected into the front end at 570 and 572. This may occur with the antenna input suppressed or attenuated or by injecting amplified signals as set forth above, depending upon the level of the signal. The signal type could include amplified noise, a continuous wave tone, or some other signal type including a signal source modulated with a pseudo random bit sequence. Utilizing this approach may assist in reducing the suppression/attenuation requirement of the antenna input.

Gain Determination from Leakage Paths

Figure 6:
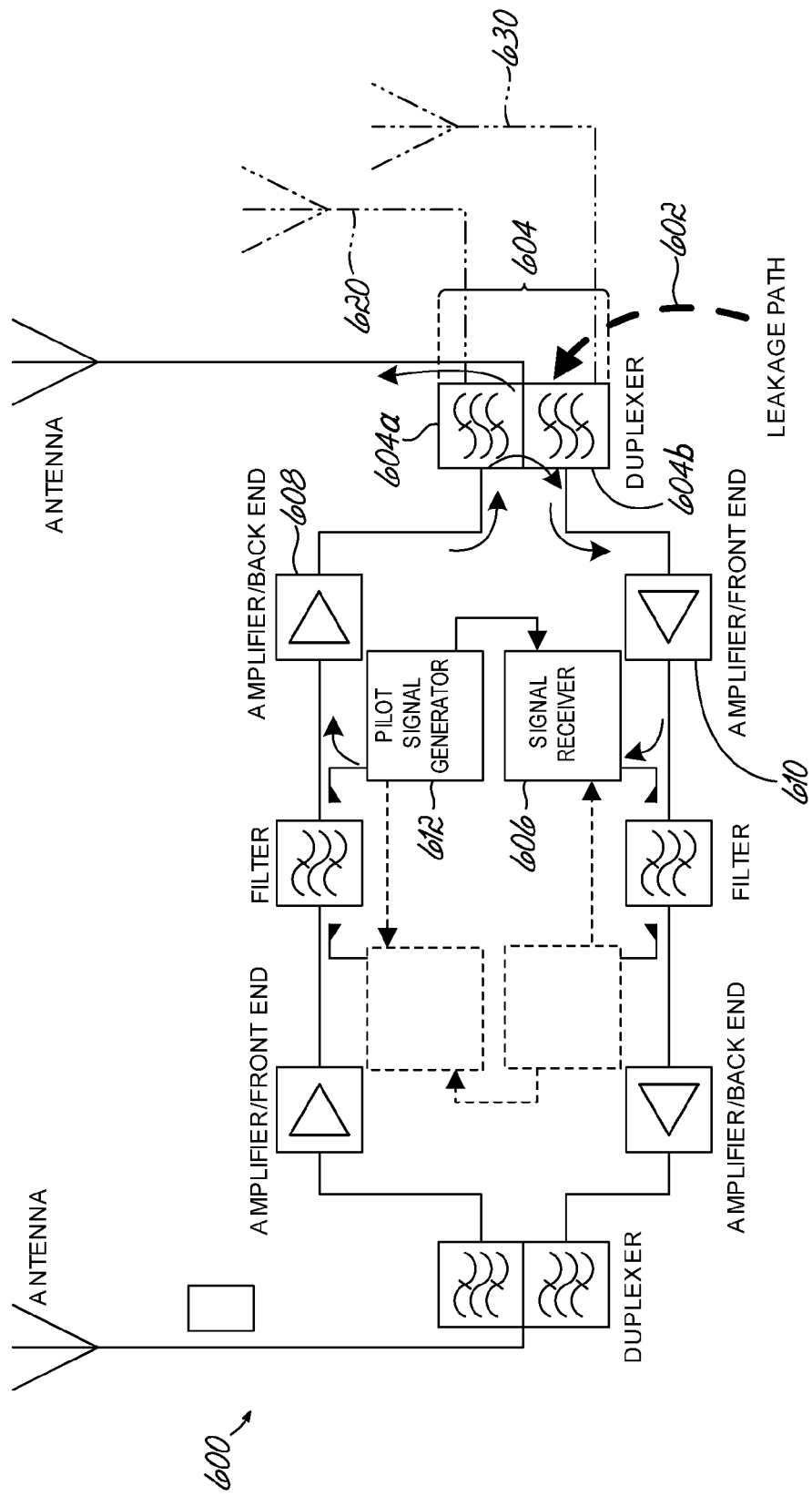
FIG. 6 contains an embodiment of a repeater indicating characterized leakage paths.

In the embodiments discussed above, additional circuitry may be required for the gain measurement of the back-end path or transmit path. Additionally, front-end and back-end gains are determined separately. Turning to the embodiment of the repeater 600 in FIG. 6, known leakage paths in this embodiment allow for the measurement of the gain of both the back-end transmit section and the front-end receive section (in its simplest form represented by amplifiers 608 and 610, respectively) at the same time as a combined measurement of front-end section and back-end section without the need, in some embodiments, for any additional hardware. Signal generation and measurements may be accomplished in the digital signal processing sections of the repeater without requiring hardware changes. The generation and measurements may be accomplished, in some embodiments, with only updates to software, for example.

One possible leakage path that may be used to determine the gain in both front-end and back-end sections in the repeater 600 may be leakage 602 through the duplex filters 604a and 604b in duplexer 604. The duplex filters 604a, 604b have predefined rejection of the transmit signals in the receive band. The rejection may be determined and calibrated in the factory over the entire frequency band. The signal received at signal receiver 606 is a known signal strength representing the total gain of the transmit and receive sections from the known gain of amplifier 608, coupling of duplexer 604, and gain of amplifier 610. This signal may be system noise in an empty band as with the embodiments discussed above, or alternatively in some embodiments, a pilot signal may be generated from a pilot signal generator 612. The pilot signal may be generated in an empty band and may be used to test the gain of the system. When the overall gain from either noise or the pilot signal drops below a predetermined threshold, it is an indication that there is a problem likely with one of the amplifiers, either 608 or 610, or a problem with the duplexer 604. Regardless of where the problem lies, the repeater would not be performing at an optimum level and would need to be serviced. One advantage of this method is that the duplexer is included in the gain measurement, and therefore, any duplexer or filter failure would be detected as well.

In some embodiments, the duplexer 604 may be replaced by two antennas. In this configuration, the back-end, amplifier 608, is connected to either a filter 604a followed by an antenna 620 or to an antenna 620 directly. A second antenna 630 may either be connected directly or via a filter 604b to the front-end, amplifier 610. The antennas may be placed closely to each other with a known amount of isolation or leakage between them. Any of the back-end gain determination methods above may then be applied.

Figure 7:
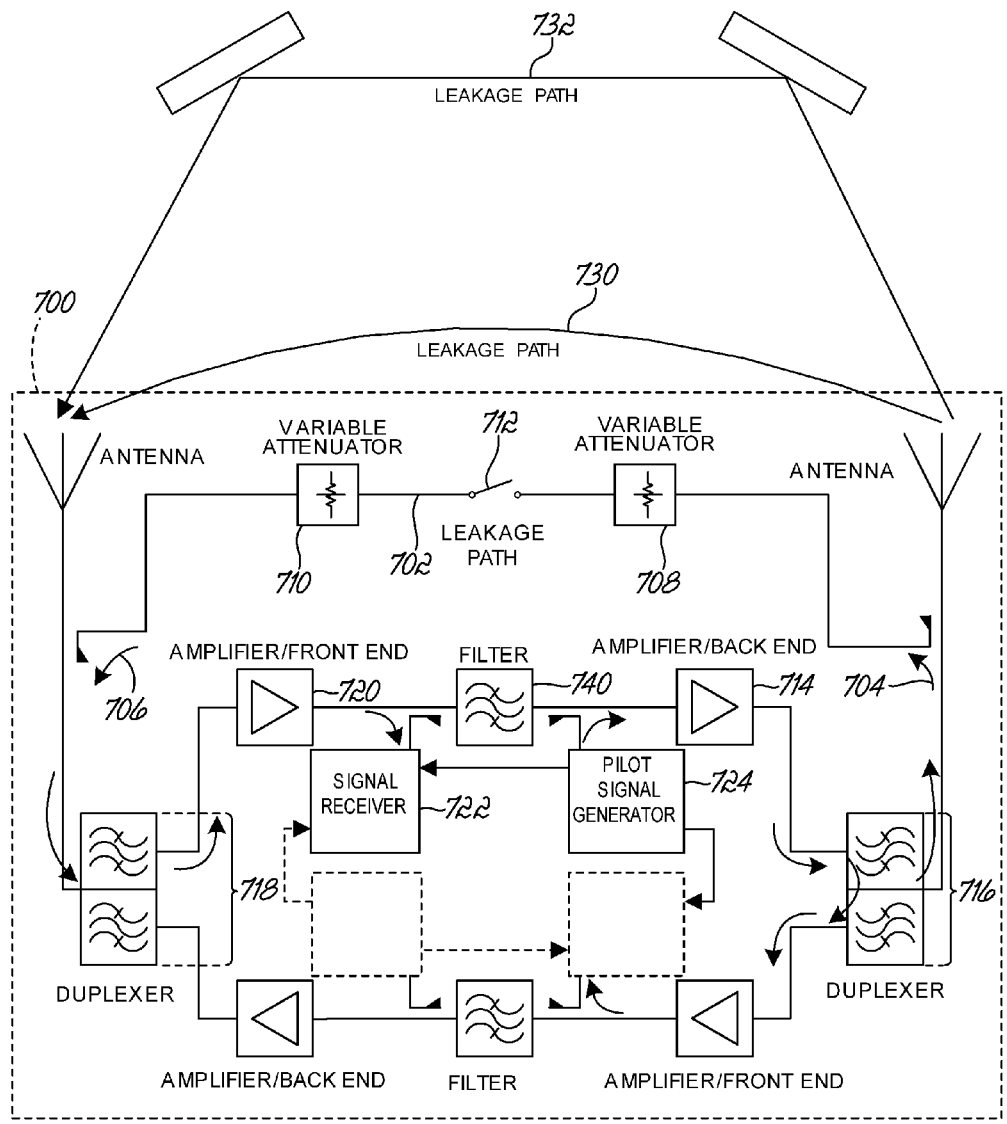
FIG. 7 contains an embodiment of a repeater indicating characterized leakage paths.

In another embodiment, as seen in FIG. 7, the gain of the repeater 700 could be measured by using a switchable artificial leakage path 702 between the output 704 and the input 706 of the repeater 700. The leakage path 702 allows the repeater 700 to switch in a known amount of attenuation 708, 710 between the two ports of the RF repeater 700. When the switch 712 is closed, completing leakage path 702 the gain through the leakage path 702 contains the chain of gain of amplifier/back-end 714, loss of duplexer 716, attenuations 708 and 710, loss of duplexer 718, and gain of amplifier/front-end 720 and filter 740. This leakage gain may be received at signal receiver 722 and compared against a threshold as with the embodiments above. The leakage gain represents the system gain since the gains of the amplifier paths 714 and 720 are known. The losses of the duplexers 716 and 718 are calibrated at the factory and the attenuations 708 and 710 may be set to known values. Therefore the signal receiver 722 may monitor the gain through the leakage path 702 when switch 712 is closed and determine if there are problems with any of the amplifiers or duplexers that would require service to the repeater. As with the embodiments described above, noise measurements may be used to check for failures, or the system may use a signal generated by pilot signal generator 724 as set forth in more detail below. This configuration also assumes that all natural leakage paths, such as paths 730 and 732 are significantly lower than the leakage path 702.

Figure 8:
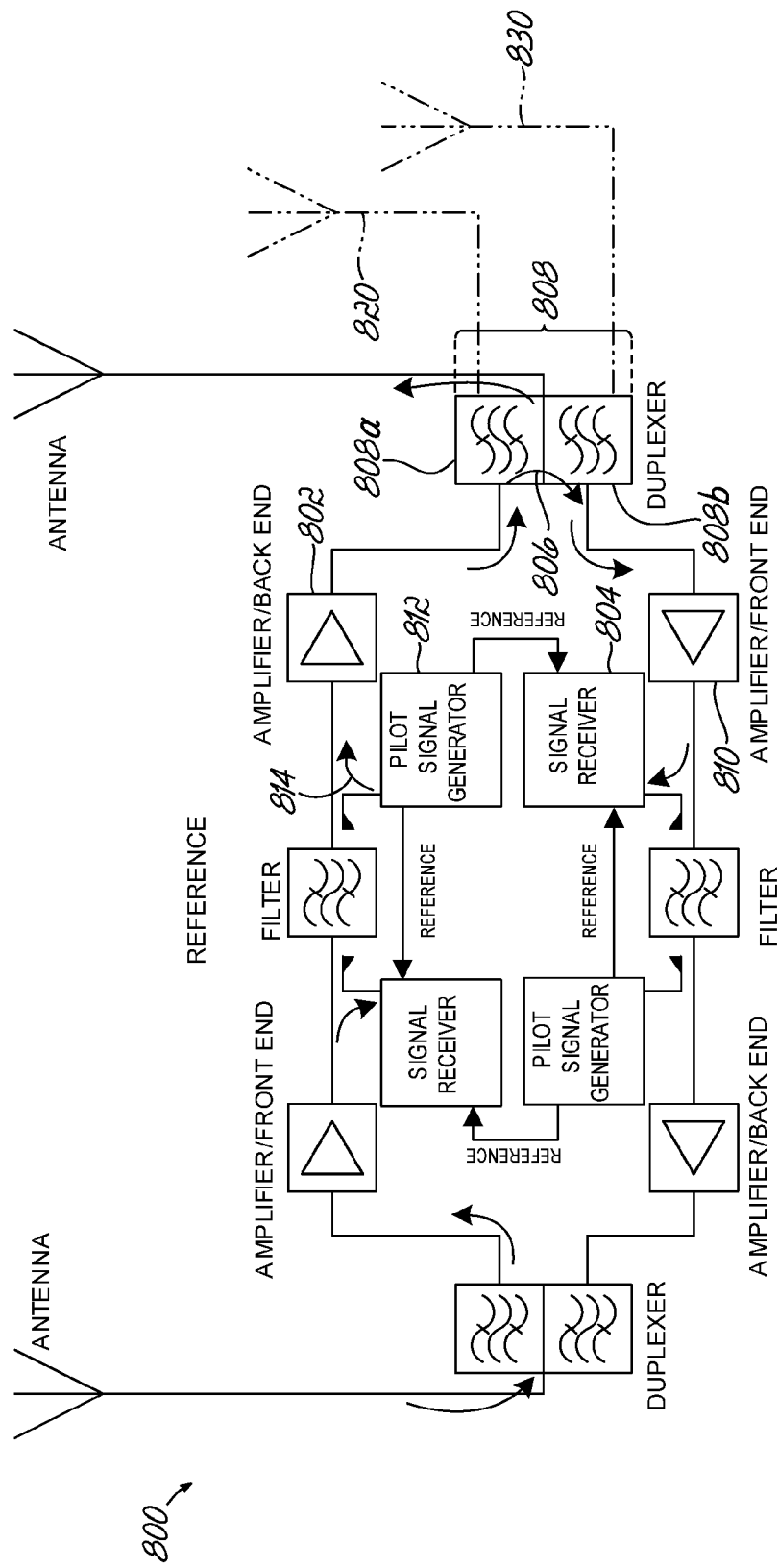
FIG. 8 contains an embodiment of a repeater indicating characterized leakage paths.

In an alternate embodiment of a repeater 800 illustrated in FIG. 8, the transmit section gain from amplifier/back-end 802 may be monitored by the receive path signal receiver 804. The leakage 806 in the duplexer 808 between section 808a and 808b should be well calibrated to ensure accurate monitoring. The signal receiver 804 and amplifier/front-end 810 should also have bandwidths that are wide enough in their frequency range to partially or fully cover the frequency range of the transmit section through amplifier 802 as well. The amplifier/front-end 810 may also be tuned to the transmit frequencies for a short time to perform the gain measurement.

In some embodiments, the duplexer 808 may be replaced by two antennas. In this configuration, the back-end 802 may be connected to either a filter 808a followed by an antenna 820 or to an antenna 820 directly. A second antenna 830 may either be connected directly or via a filter 808b to front-end 810. The antennas are placed closely to each other with a known amount of isolation or leakage between them. Any of the back-end gain determination methods above may then be applied.

Alternatively, a pilot signal may be generated in the transmit section using pilot signal generator 812. In some embodiments, the pilot signal generator 812 may generate a signal 814 on a frequency that is close to the receive band. The pilot signal frequency may also be outside of the transmit band. This may assist in suppressing the pilot signal at the antenna terminals, as it assists in preventing the pilot signal from being transmitted as high level interference in the wireless communication system. At the same time, the frequency may allow the receive amplifier/front-end 810 to receive the pilot signal without having to de-tune its synthesizer. The pilot signal does need to overcome a duplexer rejection (which is lowest at the cross-over point where the attenuation over frequency characteristics of filter 808b and filter 808a intersect) and the equivalent noise level of the receive amplifier/front-end 810.

Implementing digital signaling processing with digitized intermediate frequency signals in some embodiments would potentially allow the simple addition of this feature without any changes to the printed circuit boards. The pilot signal 814 may be generated in the digital section or an amplified signal of a repeated wireless standard could be used instead. The measurement receiver may also be implemented in the digital section as well. Adding the gain measurement capability to an existing digital RF repeater may only require a software update. The duplexer rejection could be either calibrated or, for an already deployed system, measured in a learning phase. After calibration or termination of learning phase, a variation from the expected number would represent a gain change in either amplifier/back-end 802 or amplifier/front-end 810. The gain of amplifier/front-end 810 may be determined from a noise measurement. The combination of both would then allow the measurement of the gain of amplifier/back-end 802.

Alarm Determination

By determining front-end and back-end gains independently of one another, at least four possible alarm conditions may exist. These include downlink front-end, downlink back-end, uplink front-end, and uplink back-end. Any failures determined from the gain measurements of the front-end and back-end of the uplink and downlink directions may then be sent upstream, either as a separate uplink message, or along other control or network lines that may be connected to the repeater. The location of the alarm may also prove useful for repair or replacement, if only portions of the repeater electronics need to be replaced or repaired.

Figure 9A:
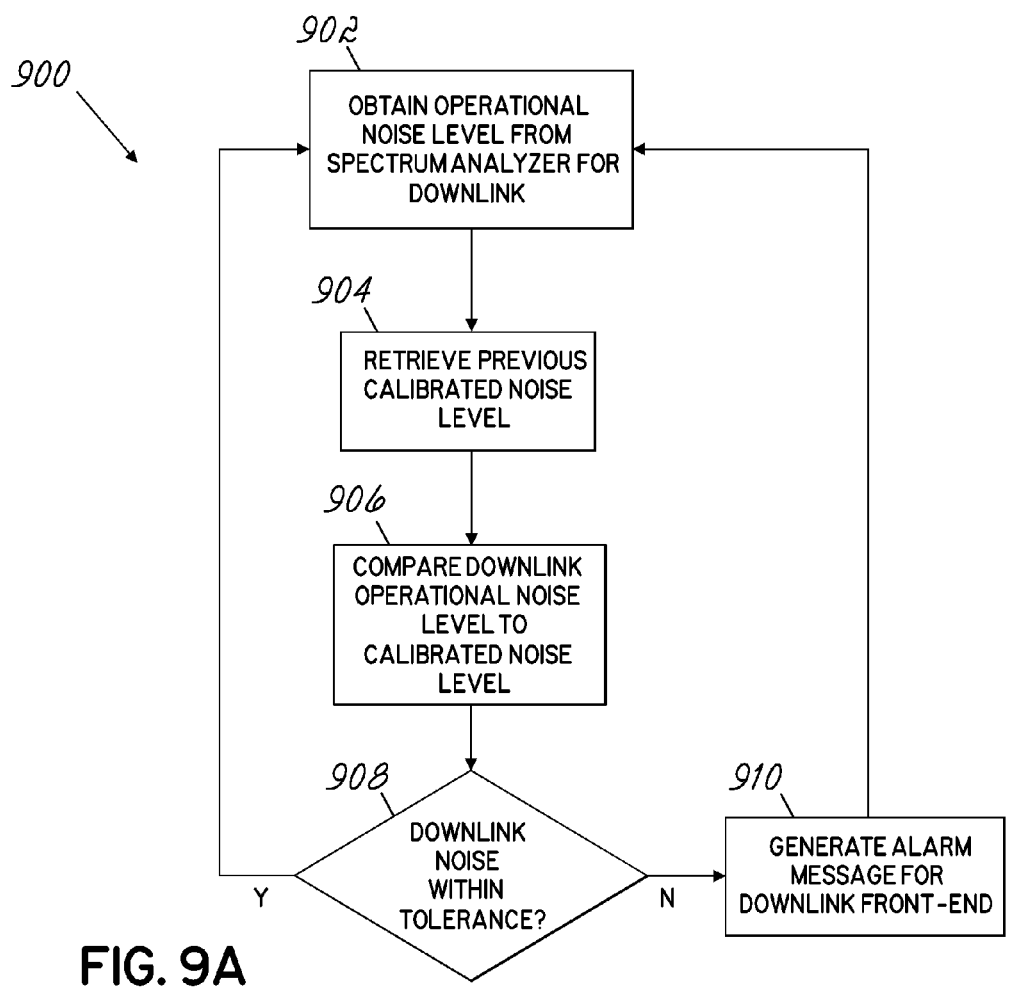
FIGS. 9A and 9B are flowcharts for detecting front-end failures.

As set forth above with respect to front-end gain determination, this is primarily accomplished in the existing power detectors 122, 124 in the digital processing components 102, 104 as seen in FIGS. 1A and 1B. As seen in flowchart 900 in FIG. 9A, the operational noise spectrum is obtained from the spectrum analyzer by one of the methods set forth above for the downlink direction (block 902). The noise level that was previously calibrated and stored is then retrieved (block 904). A comparison of the measured operational noise in the downlink direction is made with previously stored/calibrated noise values (block 906). If the downlink noise is not within a specified tolerance ("No" branch of decision block 908), then an alarm for the downlink front end is generated (block 910) and transmitted either through an uplink message or other communication with the repeater. If the noise is within tolerance ("Yes" branch of decision block 908), tests can begin again at block 902.

Figure 9B:
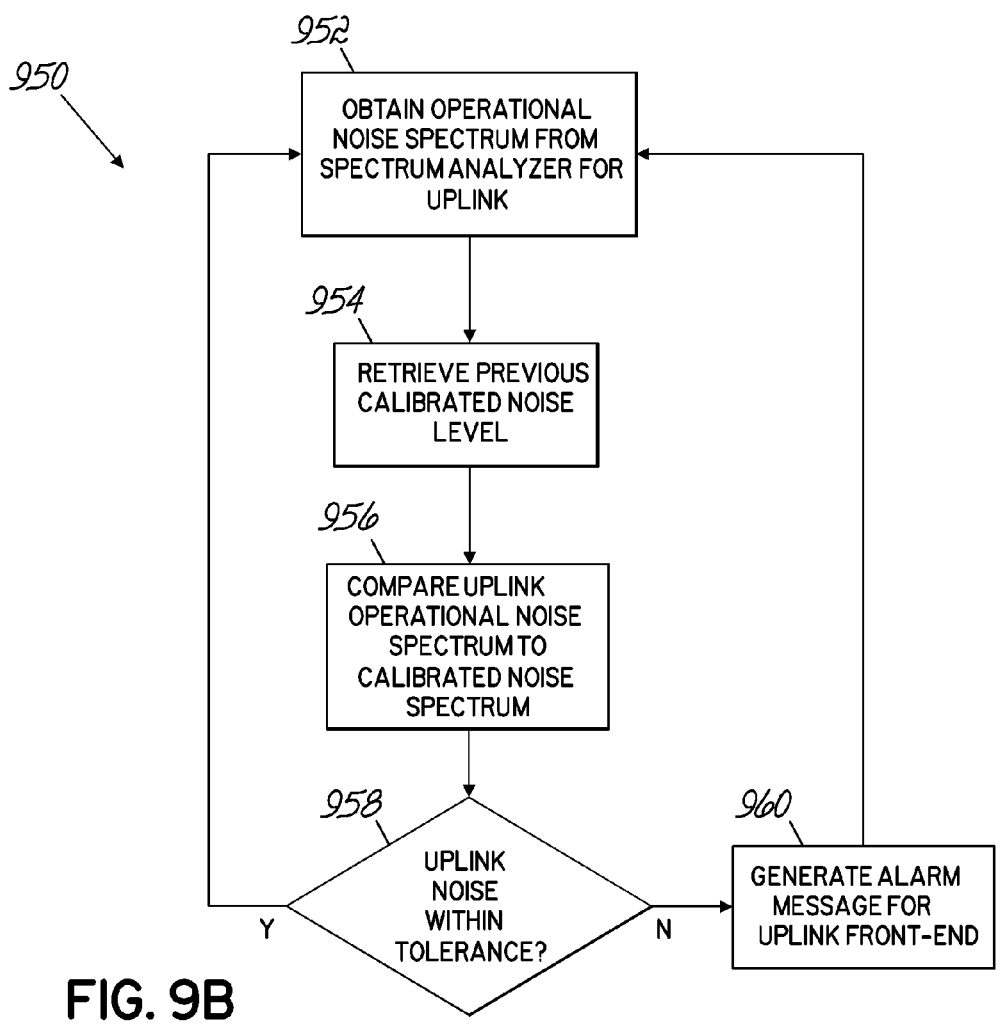

Similar operations occur for front-end gain determination for the uplink direction. As seen in flowchart 950 in FIG. 9B, the operational noise spectrum is obtained from the spectrum analyzer by one of the methods set forth above for the uplink direction (block 952). The noise level that was previously calibrated and stored is then retrieved (block 954). A comparison of the measured operational noise in the uplink direction is made with previously stored/calibrated noise values (block 956). If the uplink noise is not within a specified tolerance ("No" branch of decision block 958), then an alarm for the uplink front end is generated (block 960) and transmitted either through an uplink message or other communication with the repeater. If the noise is within tolerance ("Yes" branch of decision block 958), tests can begin again at block 952. Tests for either the uplink or downlink directions may be continuous or performed at specific intervals. For the embodiments where the antenna is switched off, tests may occur less frequently, for example once or twice during off-peak times.

Figure 10A:
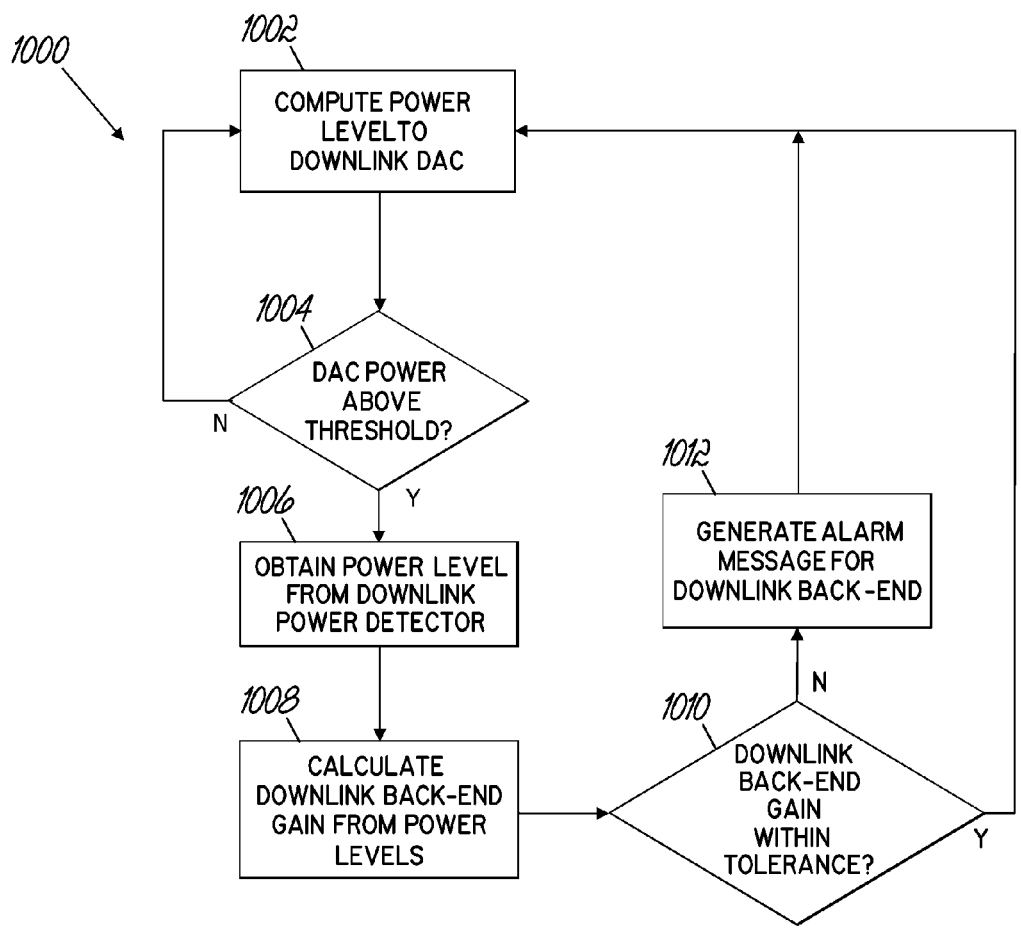
FIGS. 10A and 10B are flowcharts for detecting back-end failures.

As set forth above, back-end gain may be determined from the difference of the power measured at the output of the power amplifier and the known signal level at the input of the digital-to-analog converter (DAC). The process for the downlink direction may be seen in flowchart 1000 in FIG. 10A. Power levels at the input of the downlink DAC are computed (block 1002) from the digitized signal waveform in the digital section of the repeater. If the input to the DAC is below a specified threshold value ("No" branch of decision block 1004), then the gain determination and fault assessment are skipped, and the process may begin again at block 1002. If, however, the input to the DAC is above a specified threshold ("Yes" branch of decision block 1004), then the power level is obtained from the downlink power amplifier (block 1006). The power ratio (or difference, if the power levels are measured in dB) is then calculated to determine the back-end gain (block 1008). The power ratio or difference may be determined using hardware, or hardware and software. For example, as seen in FIGS. 1A and 1B, one or more FPGAs 170, 172 may be utilized to determine the difference and perform the comparison. Similarly other special ASICs or other programmable chips may be used. Furthermore, the repeater 100 may be controlled by a controller (not shown) and the controller may determine the differences and other threshold comparisons. If the backend gain does not meet a specified tolerance ("No" branch of decision block 1010), then an alarm for the downlink back-end is generated (block 1012) and transmitted either through an uplink message or other communications with the repeater. If the back-end gain is within tolerance ("Yes" branch of decision block 1010), tests may begin again at block 1002.

Figure 10B:
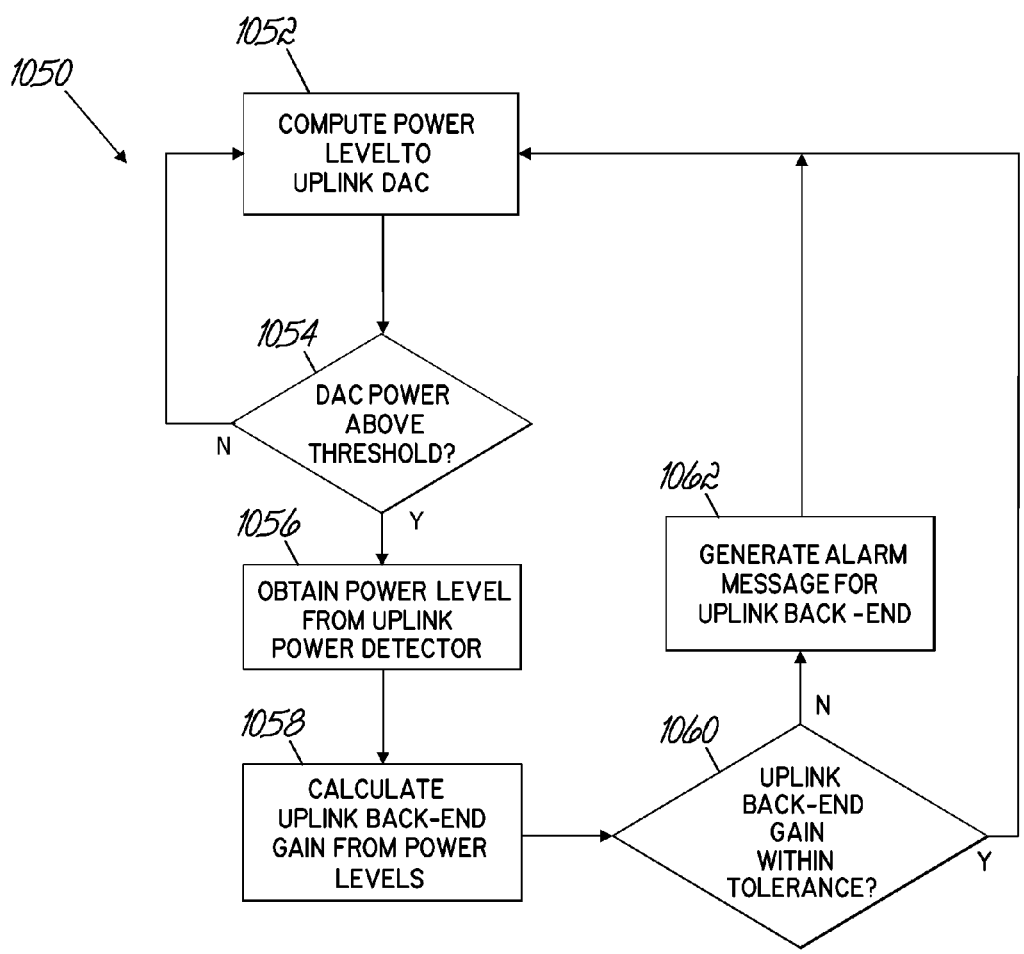

Similarly for the uplink side, the process may be seen in flowchart 1050 in FIG. 10B. Power levels at the input of the uplink DAC are computed (block 1052) from the digitized signal waveform in the digital section of the repeater. If the input to the DAC is below a specified threshold value ("No" branch of decision block 1054), then the gain determination and fault assessment are skipped, and the process may begin again at block 1052. If, however, the input to the DAC is above a specified threshold ("Yes" branch of decision block 1054), then a power level is obtained from the uplink power amplifier (block 1056). The power ratio (or difference, if the power levels are measured in dB) is then calculated to determine the back-end gain (block 1058). Similar to the downlink side, the power ratio or difference may be calculated using hardware, or hardware and software. If the backend gain does not meet a specified tolerance ("No" branch of decision block 1060), then an alarm for the uplink back-end is generated (block 1062) and transmitted either through an uplink message or other communications with the repeater. If the back-end gain is within tolerance ("Yes" branch of decision block 1060), tests may begin again at block 1052. Because there is no interruption to the signals when calculating and comparing back-end gains, these tests may be performed at any time. In some embodiments, determination of the front-end and back-end gains may be coordinated. In other embodiments, they may be checked independently of one another.

While the present invention has been illustrated by a description of one or more embodiments thereof and while these embodiments have been described in considerable detail, they are not intended to restrict or in any way limit the scope of the appended claims to such detail. The methodology that the embodiments of the invention cover applies not only to RF repeaters, but is also applicable to at least Distributed Antennal Systems ("DAS") and remote radio heads. The methodology of the embodiments of the invention disclosed herein is generic enough to measure gain in all the additional above mentioned types of equipment as well as other related devices where gain may be measured. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A signal repeating device for repeating signals in a wireless communication system, the signal repeating device comprising:
   signal path elements for defining at least an uplink signal path or a downlink signal path in the signal repeating device, the signal path elements including:
   frequency conversion circuitry;
   filter circuitry;
   amplifier circuitry;
   circuitry configured for obtaining an operational noise measurement in a signal path of the signal repeating device and for measuring an operational noise level in a frequency band that is outside of and adjacent to a bandwidth of a first element located in the signal path;
   circuitry configured for retrieving a stored parameter that includes a previously determined reference noise level for the signal repeating device and
   comparing the measured operational noise level to the retrieved reference noise level parameter and using the comparison to evaluate the gain of at least a section of the signal repeating device to determine a failure or malfunction of an element in the signal repeating device.

2. The signal repeating device of claim 1, wherein the frequency band for measuring the operational noise level is within a wider bandwidth of a second, subsequent element in the same signal path as the first element.

3. The signal repeating device of claim 1 further comprising:
   circuitry configured for tuning an input frequency band of the signal repeating device to shift the input frequency band of the signal path partially or completely outside of a bandwidth of the first element to create an open frequency band that is outside of and adjacent to the bandwidth of the first element for measuring an operational noise level in the created open frequency band.

4. The signal repeating device of claim 1, further comprising circuitry for generating an alarm when the operational noise level is outside of a specified tolerance with respect to the stored parameter.

5. The signal repeating device of claim 1, further comprising:
   digital-to-analog circuitry in the signal path configured for forming a digital section in the signal path;
   digital processing circuitry configured for computing a power level at a point in the digital section of the signal path;
   circuitry for measuring a power level at a point in a back end of the signal path and calculating a gain for a section of the signal repeating device using the measured back end power level and the computed power level in the digital section.

6. The signal repeating device of claim 5, further including circuitry configured for comparing the calculated gain to a predetermined range.

7. The signal repeating device of claim 6, wherein the circuitry is configured, in response to the calculated gain deviating from the predetermined range, for generating an alarm indicative of the gain deviation.

8. The signal repeating device of claim 1, wherein the stored parameter includes a gain and a reference signal.

9. The signal repeating device of claim 1, wherein the signal repeating device is selected from a group consisting of: a repeater, a distributed antenna system, and a remote radio head.

10. The signal repeating device of claim 1, wherein the first element is selected from a group consisting of: an RF filter, an IF filter, and a digital filter.

11. A signal repeating device for repeating signals in a wireless communication system, the signal repeating device comprising:
signal path elements for defining at least an uplink signal path or a downlink signal path in the signal repeating device to couple to an antenna, the signal path elements including:
frequency conversion circuitry;
filter circuitry;
amplifier circuitry;
circuitry configured for obtaining an operational noise measurement by suppressing an input signal from an antenna coupled to a signal path by disconnecting the antenna in the signal path and for measuring an operational noise level in a frequency band that is within a bandwidth of the signal repeating device;
circuitry configured for retrieving a stored parameter that includes a previously determined reference noise level for the signal repeating device and comparing the measured operational noise level to the retrieved reference noise level parameter and using the comparison to evaluate the gain of at least a section of the signal repeating device to determine a failure or malfunction of an element in the signal repeating device.

12. The signal repeating device of claim 11 further comprising circuitry for generating an alarm when the operational noise level is outside of a specified tolerance with respect to the stored parameter.

13. The signal repeating device of claim 11 wherein the amplifier circuitry is configured for amplifying the operational noise level prior to the noise level measurement.

14. The signal repeating device of claim 11, further comprising a signal generator configured for introducing a pilot signal prior to the operational noise level measurement.

15. A signal repeating device for repeating signals in a wireless communication system, the signal repeating device comprising:
signal path elements for defining at least an uplink signal path or a downlink signal path in the signal repeating device to couple to an antenna, the signal path elements including:
frequency conversion circuitry;
filter circuitry;
amplifier circuitry;
circuitry configured for capturing a leakage signal from a defined leakage path in the signal repeating device using a signal receiver and for evaluating the gain of the leakage signal, the defined leakage path reflecting the gain of a signal passing through elements of the signal repeating device; and
circuitry configured for comparing the gain of the leakage signal to a predetermined threshold that is a function of gain and attenuation characteristics of elements of the signal repeating device that are located in the defined leakage path and for using the comparison to determine a failure or malfunction of an element in the signal repeating device.

16. The signal repeating device of claim 15, further comprising:
circuitry configured for measuring a signal level in the leakage path at an input to a back-end of the signal repeating device;
circuitry configured for measuring a portion of an output signal of the back-end that is received via a pre-determined leakage path to a first element or an over-the-air leakage path of a known value into a front-end of an opposite direction signal path of the signal repeating device;
circuitry configured for determining a back-end gain by determining a ratio between a front-end output of the signal level and back-end input using a front-end gain and the pre-determined leakage between front-end and back-end wherein the front-end gain is determined by measuring an operational noise level in an open band.

17. The signal repeating device of claim 15 further comprising a switch in the leakage path that is selectively closed to capture the leakage signal.

18. The method of claim 17, wherein signals from natural leakage paths are significantly lower than the leakage signal from the switched leakage path.

19. The signal repeating device of claim 15 further comprising a signal generator for introducing a pilot signal into the leakage path such that the captured leakage signal contains at least a portion of the pilot signal.

20. The signal repeating device of claim 15, wherein the signal repeating device is in a form selected from a group consisting of: a repeater, a distributed antenna system, and a remote radio head.

* * * * *